C. McCrea,
Pruning Implement,
N° 58,659.    Patented Oct. 9, 1866.

Witnesses.
Jas A Service
J M Hampton

Inventor.
Cole McCrea
Per Munn & Co
Attorneys.

UNITED STATES PATENT OFFICE.

COLE McCREA, OF LEAVENWORTH, KANSAS.

IMPROVEMENT IN PRUNING-KNIVES.

Specification forming part of Letters Patent No. 58,659, dated October 9, 1866.

*To all whom it may concern:*

Be it known that I, COLE MCCREA, of Leavenworth, in the State of Kansas, have invented a new and Improved Pruning-Knife; and I do hereby declare that the following is a full, clear, and exact description thereof, which will enable others skilled in the art to make and use the same, reference being had to the accompanying drawings, forming part of this specification, in which—

Figure 1:
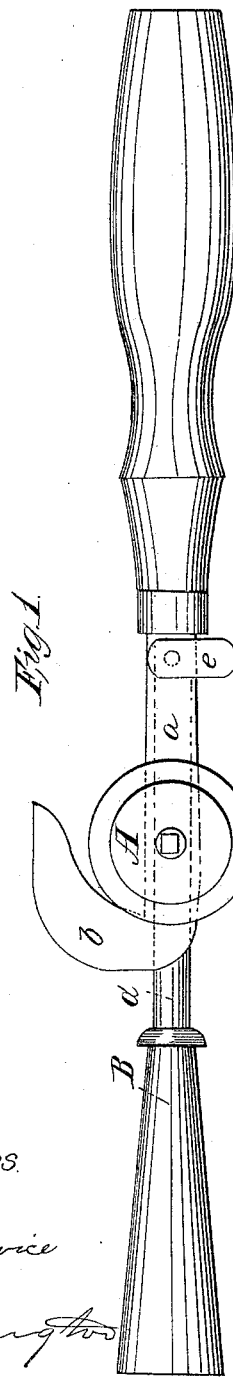
Figure 2:
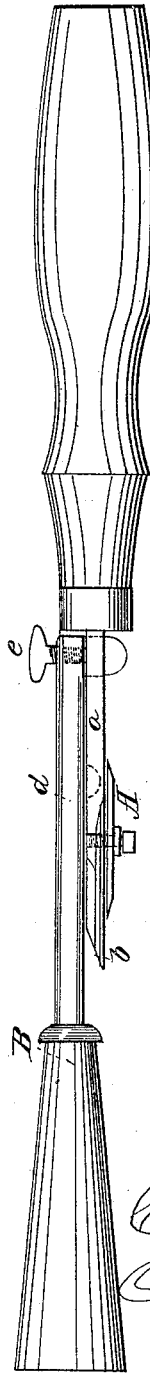

Figure 1 is a side elevation of my invention. Fig. 2 is a front edge elevation.

Similar letters of reference indicate like parts.

My invention consists in the combination, with a pruning-hook, of a rotating cutter in such manner that the twig or branch will be drawn between the two edges and severed with little labor.

It also consists in the combination, with a pruning-knife constructed as above described, of an extension-handle to be secured to the shank of the pruning-hook when it is designed to use it for cutting grafts, &c., from the top of a tree.

The pruning-hook consists of a shank, $a$, and a hooked end, $b$, both constructed in the usual manner.

A is a wheel, which is secured to the shank $a$. This wheel has a sharp cutting-edge. It is so located with regard to the edge of the hook that so soon as the twig is caught by the hook the wheel will revolve; and as the twig is drawn in the hook the two edges—that is, of the wheel and the hook—will cut the twig off quickly and without much labor, as can be readily understood.

B is an extension-handle, or rather the socket for receiving an extension-handle. Its shank $d$ carries a hooked end, which is to be placed on the shank $a$ of the pruning-hook, and it is held there by a thumb-screw, $e$, its position being as shown in the two figures. Into this socket B as long a handle as desired may be introduced, and the device will then be adapted for cutting off grafts from the top of a tree or trimming anything high which could not be reached with the short handle, which is a part proper of the pruning-knife.

This invention provides a simple and efficient pruning-knife.

What I claim as new, and desire to secure by Letters Patent, is—

1. The combination, with a pruning-hook, of a revolving wheel, A, substantially as and for the purpose described.

2. The combination, with a pruning-hook, of an extension-handle, B, substantially as specified.

COLE McCREA.

Witnesses:
ROBERT C. FOSTER,
MARTIN H. HOUSLEY.